March 18, 1958 W. G. HARTFORD ET AL 2,826,911
APPARATUS FOR DETECTING DEFECTS IN SHEET MATERIALS
Filed April 4, 1955

INVENTORS
WILLIS G. HARTFORD
JOSEPH W. HOLT

United States Patent Office 2,826,911
Patented Mar. 18, 1958

2,826,911

APPARATUS FOR DETECTING DEFECTS IN SHEET MATERIALS

Willis G. Hartford, Andover, and Joseph W. Holt, Lawrence, Mass., assignors to Champion International Company, Lawrence, Mass., a corporation of Massachusetts Application April 4, 1955, Serial No. 498,995

1 Claim. (Cl. 73—159)

This invention relates to the detection of defects in sheet materials, particularly lumps or other areas of increased thickness, and consists in a novel device for detecting such defects in a continuously travelling web of the sheet material.

Particularly advantageous use of this invention may be made in inspecting paper for defects such as color lumps or other areas of suddenly increased thickness. Defects of this sort are often serious since they can result in damage to printing plates used on the paper. Since paper normally varies in thickness and such variations are not objectionable, the detection of defective areas of abruptly increased thickness is primarily concerned with locating abrupt changes of thickness and passing increases in thickness which are gradual and normal. Prior art devices have been proposed for detecting areas where the thickness exceeds a preset maximum amount, but the use of such devices does not assure detection of lumps which do not exceed the preset maximum, nor the passing of normally occurring areas of greater than average thickness.

The present invention provides a lump detecting monitoring device which will differentiate between thickness changes normal in paper making, and occurring gradually, and thickness changes resulting from color lumps, grit particles, creases and the like, which occur suddenly. Thus, the device of the present invention is not in the least sensitive to thickness variations, as such, but will respond to the appearance of sudden thickness changes, even those occasioned by particles extremely small in relation to the thickness of the paper and to the normal variation in its thickness.

In general, this invention is based on the discovery that if a web such as paper is passed between opposed surfaces of a pair of members, at least one of which is yieldingly urged against the other, which is preferably rigidly mounted, the appearance of even minute particles or other local areas of abruptly increased thickness will cause detectable impact pulses in the yieldingly mounted member. The pulses are conveniently detected by an acceleration sensitive transducer device capable of converting a mechanical impact to an electrical signal. Accordingly, the invention features an acceleration sensitive impact detecting transducer device in solid-solid contact with a yieldingly mounted member having a surface against which the web is passed while backed an opposing rigid backing member.

In its preferred embodiment, contact with the web is made with the surfaces of opposed rollers, of which the lower one is rigidly mounted for rotation in stationary bearings and the upper one is mounted in floating bearings. The impact detecting transducer is mounted on one of the upper bearings and consists typically of a piezoelectric element mounted between a base member rigidly supported on one of the floating bearings and a solid massive member, the inertia of which provides a reference base against which impact pulses may be sensed.

This invention will best be understood and appreciated from the following detailed description of a preferred embodiment selected for purposes of illustration and shown in the accompanying drawings in which.

Figure 1:
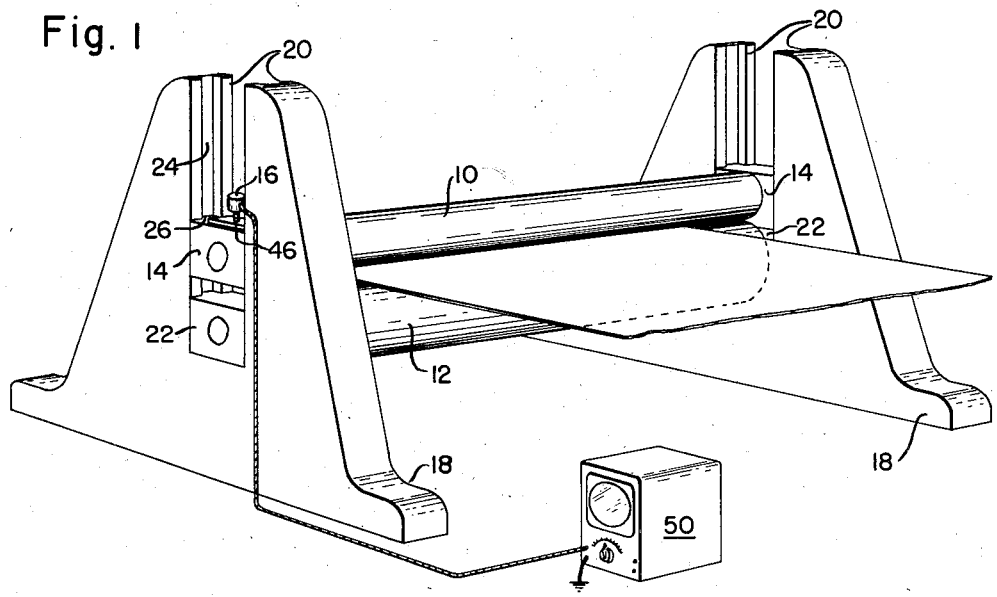
Fig. 1 is a perspective view of one preferred embodiment of this invention.

As shown in the drawings, the defect detector of this invention consists generally of a pair of vertically aligned rollers 10 and 12, with the upper roller 10 mounted in floating bearings 14—14 so as to be supported on the lower roller 12, and an impact sensitive transducer 16 mounted in contact with the upper roller on its bearings block 14.

The rollers 10 and 12 are supported between base members 18—18 each formed with a vertical guideway 20—20 in which the bearing blocks 14—14 and 22—22 are carried. The lower bearing blocks 22—22, it will be seen, rest solidly on the bottom end of the guideways 20, while the upper bearing blocks 14—14 are each formed to slide freely in the guideways. In the preferred embodiment, the guideway slides are formed with longitudinal grooves 24, and the upper bearing blocks 14—14 are provided with lateral extensions 26 accommodated in the grooves to retain them against axial displacement.

Figure 2:
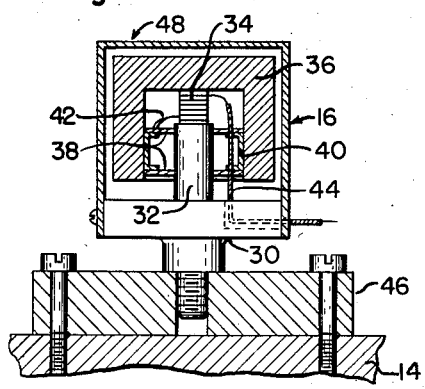
Fig. 2 is a cross-sectional elevation of the impact detecting transducer.

The impact sensitive transducer 16 mounted on one of the upper bearing blocks, as shown best in Fig. 2, consists in general of a base 30 having a base post 32 on which is mounted a piezo-electric element 34 and a solid massive member 36 carried on the element 34. The massive member 36 provides by its inertia a reference base between which and the post 32 reaction pressures on the element 34 may be develoed. The member 36 is conveniently formed as an inverted cup surrounding the post 32 and flexibly secured against relative lateral motion thereto by a pair of spaced flexible metal diaphragms 38 extending between the post and the inner walls of the cup. The outer edges of the diaphragms are secured, as by solder, to opposite ends of a short tube 40 which is fitted to the inner surface of the massive member 36.

Electrical connections to the crystal 34 are made by a wire 42 grounded on the upper diaphragm 38, and a shielded wire 44 which passes out through the base 30. For additional sensitivity the piezoelectric crystal assembly comprises a stack of several crystal wafers of for instance barium titanate or other piezoelectric material connected in electrical parallel by electrodes situated between adjacent wafers and at the top and bottom of the stack, with alternate electrodes connected in parallel to ground and the remaining alternate electrodes connected in parallel to the output wire 44.

The impact detector assembly is fastened solidly through its base 30 to the floating bearing 14 by a mounting block 46, and is shielded by a cover 48 fastened to the base 30 and surrounding the assembly.

Figure 3:
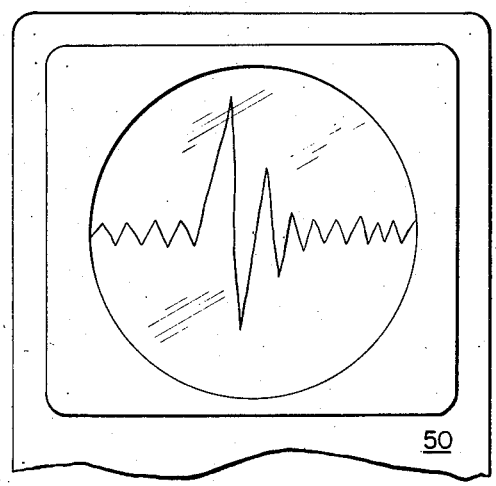
Fig. 3 is a typical oscilloscope pattern of the transducer signal when a lump passes through the detecting device shown in Fig. 1.

With the arrangement illustrated extremely small defects may be easily detected, such as minute grit particles, color lumps, folds such as those commonly referred to as calender cuts and other irregularities resulting in a sudden increase in thickness. In general, each of these will cause an impact impulse in the upper roller which will be transmitted through its bearing to the impact detector 16, and will then provide an electrical signal which may be detected in any of numerous voltage pulse responsive devices, such as an oscilloscope 50 having its vertical signal terminals connected between ground and the lead 44 from the impact detector. The oscilloscope pattern of a typical defect is shown in Fig. 3.

Although this invention has been described in detail with reference to one preferred embodiment, it is contemplated that obvious modifications will occur to those skilled in the art and that such may be made without departing from the scope of the invention. Thus, the invention generally features means engaging the surface of the paper movable in response to thickness variations, and an acceleration-sensitive transducer in solid-solid contact therewith, from which a signal corresponding to abrupt thickness changes may be detected.

The invention has been found to provide extremely sensitive detection of surface irregularities even when used with massive steel rollers between which the paper is passed, and will respond to the presence of lumps or particles far smaller than are ordinarily considered too large. Defects of this type are now generally found only by visual inspection of the paper, and it will accordingly be seen that a great savings may be realized from this invention.

For example, by the apparatus herein disclosed it is entirely practicable to detect a color lump that in area is less than a sq. mm. and in thickness not more than one ten thousandths of an inch that may occur in a web of paper 80 inches wide travelling at a rate of 700 feet per minute under an upper floating steel roller 12 inches in diameter. In addition, it will be appreciated that where the web is compressive, as is generally the case with paper and many other materials, and the opposed members are urged together, areas of suddenly increased hardness will also be detected in the same manner as areas of suddenly increased thickness.

It is also contemplated that signals from the transducer, in addition to or instead of being detected by an oscilloscope or like sensing device, may be also used to actuate other systems or devices which may be used to warn the occurrence of a defective area or to automatically reject defective material.

Having thus disclosed this invention and described in detail a preferred embodiment thereof, we claim and desire to secure by Letters Patent:

A monitoring device for detecting localized areas of increased thickness in a travelling web comprising in combination a lower solid roller member mounted for rotation in solidly supported bearing members, an upper solid roller member supported on said lower roller member and mounted for rotation in floating solid bearing members, a piezoelectric element solidly supported on one of said floating solid bearing members, a solid massive member supported on said piezoelectric member whereby impacts transmitted through said floating solid bearing member cause compression of said piezoelectric member under the reaction of said solid massive member, electrodes operatively connected with said piezoelectric member, and means responsive to electrical signals generated between said electrodes.

References Cited in the file of this patent

UNITED STATES PATENTS

| | | |
|---|---|---|
| 1,012,379 | Longden | Dec. 19, 1911 |
| 2,091,522 | Perry | Aug. 31, 1937 |
| 2,136,913 | Drain | Nov. 15, 1938 |
| 2,392,010 | Stevens | Jan. 1, 1946 |
| 2,411,401 | Welch | Nov. 19, 1946 |

FOREIGN PATENTS

| | | |
|---|---|---|
| 473,636 | Great Britain | Oct. 18, 1937 |
| 702,211 | Germany | Feb. 1, 1941 |